(12) United States Patent
Ahmad et al.

(10) Patent No.: US 12,502,416 B1
(45) Date of Patent: Dec. 23, 2025

(54) PAM3CSK4 INJECTION FOR THE PREVENTION AND MANAGEMENT OF MASLD

(71) Applicant: DASMAN DIABETES INSTITUTE, Dasman (KW)

(72) Inventors: Rasheed Ahmad, Dasman (KW); Fahd Al-Mulla, Dasman (KW); Fatema Al-Rashed, Dasman (KW); Shihab Kochumon, Dasman (KW)

(73) Assignee: Dasman Diabetes Institute, Dasman (KW)

( * ) Notice: Subject to any disclaimer, the term of this patent is extended or adjusted under 35 U.S.C. 154(b) by 0 days.

(21) Appl. No.: 19/172,886

(22) Filed: Apr. 8, 2025

(51) Int. Cl.
*A61K 38/08* (2019.01)
*A61P 1/16* (2006.01)

(52) U.S. Cl.
CPC .............. *A61K 38/08* (2013.01); *A61P 1/16* (2018.01)

(58) Field of Classification Search
CPC ................................ A61K 38/08; A61P 1/16
See application file for complete search history.

(56) References Cited

U.S. PATENT DOCUMENTS

2022/0202861 A1    6/2022    Ichim et al.

FOREIGN PATENT DOCUMENTS

| CN | 115300606 A | 11/2022 | | |
|---|---|---|---|---|
| WO | WO-2018026866 A1 | * | 2/2018 | ............... A61P 43/00 |
| WO | 2018236988 A1 | | 12/2018 | |
| WO | WO-2019191189 A1 | * | 10/2019 | ........... C07C 317/22 |

OTHER PUBLICATIONS

Zou et al., 2024, Comparing similarities and differences between NAFLD, MAFLD, and MASLD in the general U.S. population, Frontiers in Nutrition, 11: 1411802 (11 pages).*
Miura et al., 2010, Role of Toll-like Receptors and Their Downstream Molecules in the Development of Nonalcoholic Fatty Liver Disease, Gastroenterology Research and Practice, 2010, 362847 (9 pages).*
Baumann et al., 2021, Toll-like receptor 1 as a possible target in non-alcoholic fatty liver disease, Scientific Reports, 11: 17815 (15 pages).*
Khanmohammadi et al., 2022, Toll-like receptors and metabolic (dysfunction)-associated fatty liver disease, Pharmacological Research, 185: 106507 (11 pages).*
Zhang et al., 2021, TLR2 inhibition ameliorates the amplification effect of LPS on lipid accumulation and lipotoxicity in hepatic cells, Ann Transl Med, 9(18): 1429 (12 pages).*
Wang et al., 2023, TLR2 and CASP7 as the biomarkers associated ith non-alcoholic fatty liver disease and chronic kidney disease, Biochemical and Biophysical Research Communications, 667: 50-57.*
Lin et al., 2021, Oscillating lncRNA PLatr4 regulates NLRP3 inflammasome to ameliorate nonalcoholic steatohepatitis in mice, Theranostics, 11(1): 426-444.*
Roh et al., 2015, TLR2 and TLR9 contribute to alcohol-mediated liver injury through induction of CXCL1 and neutrophil infiltration, Am J Physiol Gastrointest Liver Physiol, 309: G30-G41.*
Shi et al., 2023, Novel role for epalrestat: protecting against NLRP3 inflammasome-driven NASH by targeting aldose reductase, Journal of Translational Medicine, 21: 700 (17 pages).*
Faraj et al., 2019, Dietary Toll-like Receptor Stimulants Promote Hepatic Inflammation and Impair Reverse Cholesterol Transport in Mice via Macrophage-Dependent Interleukin-1 Production, Frontiers in Immunology, 10: 1404 (19 pages).*
Gao et al., 2022, Myeloid cell TBK1 restricts inflammatory responses, PNAS, 119(4): e2107742119 (11 pages).*
Li et al., 2015, Down-regulation of miR-144 elicits proinflammatory cytokine production by targeting toll-like receptor 2 in nonalcoholic steatohepatitis of high-fat-diet-induced metabolic syndrome E3 rats, Molecular and Cellular Endocrinology, 402: 1-12.*
Das et al., 2025, Role of serum endotoxin, FGF19, TLR2, TNF-alpha, IL-12, and IL-10 in NAFLD-associated T2DM pathogenesis: Insights into Th1 bias and protective mechanisms, Indian Journal of Gastroenterology, 44(2): 171-180.*
Li, "The influence of gut derived antigens and hepatic steatosis-associated fatty acids on chemotaxis, innate immunity and pro-inflammatory cytokine expression in patients with non-alcoholic fatty liver disease." (2018), abstract only, 1 page.
Li, et al. "The effects of pathogen-associated molecular patterns on peripheral blood monocytes in patients with non-alcoholic fatty liver disease." Journal of Clinical and Experimental Hepatology 12.3 (2022): 808-817 See provided copy, not the full reference.

* cited by examiner

*Primary Examiner* — Amber D Steele
(74) *Attorney, Agent, or Firm* — Nath, Goldberg & Meyer; Joshua B. Goldberg

(57) ABSTRACT

A method of treating metabolic dysfunction-associated steatotic liver disease in a patient, reducing hepatic fat accumulation in a patient, and/or eliminating hepatic fat in a patient can include administering a therapeutically effective amount of Pam3CysSerLys4 (Pam3CSK4) to the patient in need thereof. The therapeutically effective amount of Pam3CysSerLys4 may be administered via an Intraperitoneal (IP) injection.

16 Claims, 4 Drawing Sheets
Specification includes a Sequence Listing.

PAM3CSK4 INJECTION FOR THE PREVENTION AND MANAGEMENT OF MASLD

SEQUENCE LISTING

The instant application contains a Sequence Listing which has been submitted in XML format via EFS-Web and is hereby incorporated by reference in its entirety. Said XML copy, created on Jun. 11, 2025, is named 33024.22U Sequence Listing.xml and is 2,162 bytes in size.

BACKGROUND

1. Field

The present disclosure relates to a method of treating metabolic dysfunction-associated steatotic liver disease (MASLD), previously known as non-alcoholic fatty acid liver disease (NAFLD), through injections of Pam3CSK4 (SEQ ID NO: 1).

2. Description of the Related Art

Metabolic dysfunction-associated steatotic liver disease (MASLD), previously known as non-alcoholic fatty liver disease (also called NAFLD) is a disease in which excessive fat accumulates in the liver of a patient. Early-stage MASLD does not usually cause any harm, but nonalcoholic steatohepatitis (NASH) can lead to serious liver damage, including fibrosis or cirrhosis. Nearly 25% of the world's population is affected by MASLD. There are no FDA-approved medications for the treatment of MASLD currently and although lifestyle modifications with appropriate diet and exercise are beneficial, this has been difficult to achieve and sustain for the majority of patients.

Thus, a method of treating MASLD and solving the aforementioned problems is desired.

SUMMARY

The present subject matter relates to a therapy for metabolic dysfunction-associated steatotic liver disease (MASLD) (previously known as non-alcoholic fatty liver disease (NAFLD)) and associated complications. The present subject matter has the potential to cure MASLD patients.

The present disclosure relates to the administration of Pam3CSK4 (SEQ ID NO: 1) (Pam3CysSerLys4 (SEQ ID NO: 1): a synthetic triacylated lipopeptide (LP) and a TLR2/TLR1 ligand) as an effective treatment for MASLD. The data demonstrate that intraperitoneal (IP) administration of Pam3CSK4 (SEQ ID NO: 1) solution effectively reduces hepatic fat accumulation and improves fasting blood glucose levels in obese mice with steatosis. Treated mice showed 100% normal liver without any fat. The injection of Pam3CSK4 (SEQ ID NO: 1) not only clears fat from the fatty liver but also prevents further fat uptake by the liver.

The present subject matter relates to a method of treating non-alcoholic fatty liver disease in a patient comprising administering a therapeutically effective amount of Pam3CysSerLys4 (SEQ ID NO: 1) to the patient in need thereof.

The therapeutically effective amount of Pam3CysSerLys4 (SEQ ID NO: 1) may be administered via an Intraperitoneal (IP) injection.

The present subject matter also relates to a method of reducing hepatic fat accumulation in a patient comprising administering a therapeutically effective amount of Pam3CysSerLys4 (SEQ ID NO: 1) to the patient in need thereof.

The present subject matter also relates to a method of eliminating hepatic fat in a patient comprising administering a therapeutically effective amount of Pam3CysSerLys4 (SEQ ID NO: 1) to the patient in need thereof.

These and other features of the present subject matter will become readily apparent upon further review of the following specification.

DETAILED DESCRIPTION OF THE PREFERRED EMBODIMENTS

Figure 1:
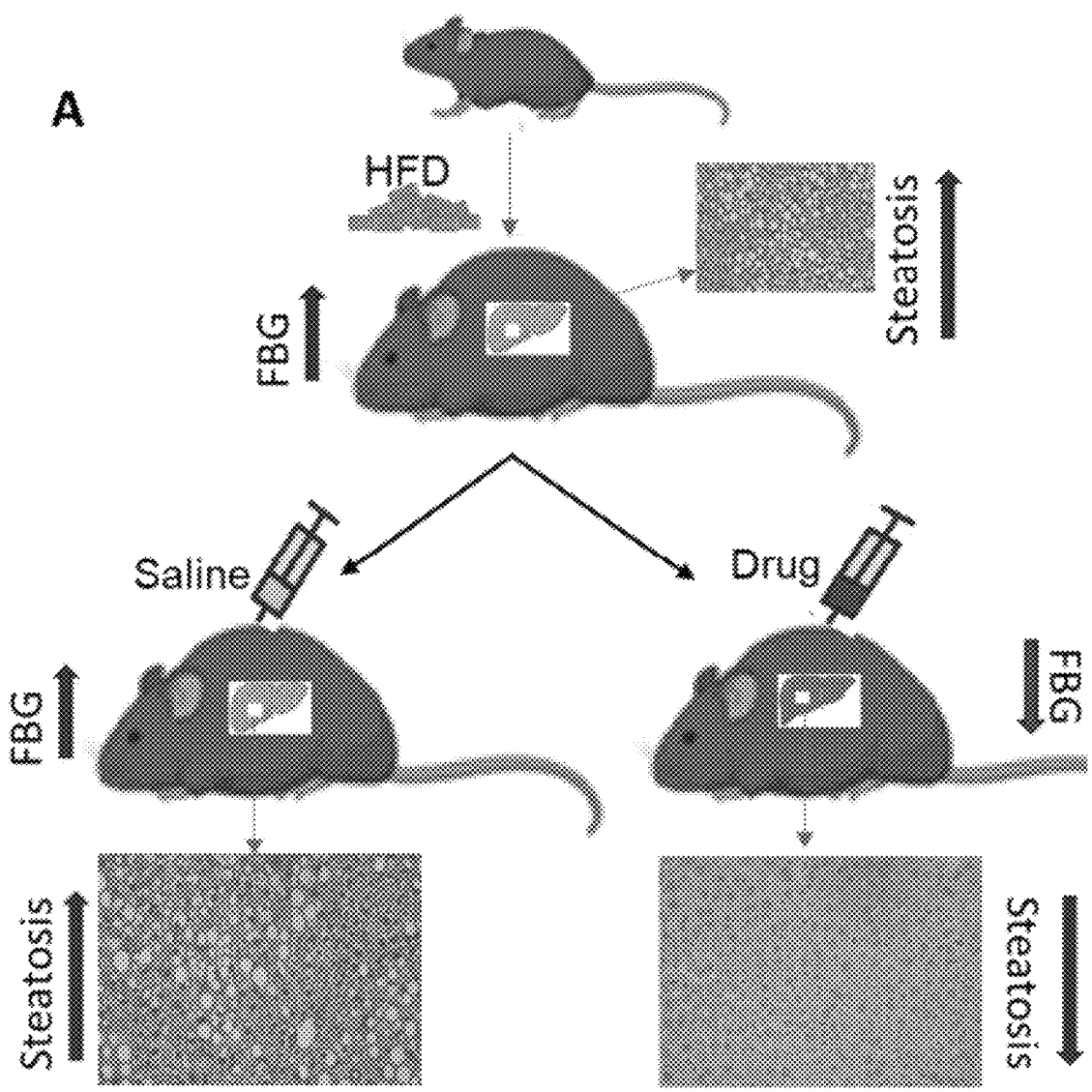
FIG. 1 is a schematic diagram summarizing results of a liver section histology experiment demonstrating Pam3CSK4 (SEQ ID NO: 1) injections eliminate fat from the liver.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

"Subject" as used herein refers to any animal classified as a mammal, including humans, domestic and farm animals, and zoo, sports, and pet companion animals such as household pets and other domesticated animals such as, but not limited to, cattle, sheep, ferrets, swine, horses, poultry, rabbits, goats, dogs, cats and the like.

"Patient" as used herein refers to a subject in need of treatment of a condition, disorder, or disease, such as cancer.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method of treating non-alcoholic fatty liver disease. The method includes the administration of Pam3CSK4 (SEQ ID NO: 1) (Pam3CysSerLys4 (SEQ ID NO: 1): a synthetic triacylated lipopeptide (LP) and a TLR2/TLR1 ligand) may be an effective treatment for MASLD. The data demonstrate that intraperitoneal (IP) administration of Pam3CSK4 (SEQ ID NO: 1) solution effectively reduces hepatic fat accumulation and improves fasting blood glucose levels in obese mice with steatosis. Treated mice showed 100% normal liver without any fat. In an embodiment, the injection of Pam3CSK4 (SEQ ID NO: 1) not only clears fat from the fatty liver but also prevents further fat uptake by the liver.

Currently, there are no FDA-approved medications for the treatment of MASLD. Although lifestyle modifications with appropriate diet and exercise are beneficial, this can be difficult to achieve and sustain for the majority of patients. In an embodiment, administration of Pam3CSK4 (SEQ ID NO: 1) has the potential to completely cure MASLD.

In an embodiment, the present subject matter relates to a method of treating non-alcoholic fatty liver disease in a patient. The method may comprise administering a therapeutically effective amount of Pam3CysSerLys4 (SEQ ID NO: 1) to the patient in need thereof.

In certain embodiments, the therapeutically effective amount of Pam3CysSerLys4 (SEQ ID NO: 1) may be administered via an Intraperitoneal (IP) injection. In certain embodiments, a dosage of the Pam3CysSerLys4 (SEQ ID NO: 1) may be 10 µg/kg every other day for two weeks.

In further embodiments, the method may further reduce hepatic fat accumulation from a baseline.

In other embodiments, the method may prevent increasing fat accumulation from a baseline.

In still other embodiments, the method may lower fasting glucose from a baseline.

In another embodiment, the present subject matter may relate to a method of reducing hepatic fat accumulation in a patient. The method may include administering a therapeutically effective amount of Pam3CysSerLys4 (SEQ ID NO: 1) to the patient in need thereof.

In certain embodiments, the therapeutically effective amount of Pam3CysSerLys4 (SEQ ID NO: 1) may be administered via an Intraperitoneal (IP) injection. In certain embodiments, a dosage of the Pam3CysSerLys4 (SEQ ID NO: 1) may be 10 µg/kg every other day for two weeks.

In further embodiments, the method may prevent increasing fat accumulation from a baseline.

In other embodiments, the method may lower fasting glucose from a baseline.

In still another embodiment, the present subject matter may relate to a method of eliminating hepatic fat in a patient. The method may include administering a therapeutically effective amount of Pam3CysSerLys4 (SEQ ID NO: 1) to the patient in need thereof.

In certain embodiments, the therapeutically effective amount of Pam3CysSerLys4 (SEQ ID NO: 1) may be administered via an Intraperitoneal (IP) injection. In certain embodiments, a dosage of the Pam3CysSerLys4 (SEQ ID NO: 1) may be 10 µg/kg every other day for two weeks.

In further embodiments, the method may prevent increasing fat accumulation from a baseline.

In other embodiments, the method may lower fasting glucose from a baseline.

In this regard, the present subject matter is further directed to pharmaceutical compositions comprising a therapeutically effective amount of the composition as described herein together with one or more pharmaceutically acceptable carriers, excipients, or vehicles. In some embodiments, the present compositions can be used for combination therapy, where other therapeutic and/or prophylactic ingredients can be included therein.

Non-limiting examples of suitable excipients, carriers, or vehicles useful herein include liquids such as water, saline, glycerol, polyethyleneglycol, hyaluronic acid, ethanol, and the like. Suitable excipients for nonliquid formulations are also known to those of skill in the art. A thorough discussion of pharmaceutically acceptable excipients and salts useful herein is available in Remington's Pharmaceutical Sciences, 18th Edition. Easton, Pa., Mack Publishing Company, 1990, the entire contents of which are incorporated by reference herein.

The present composition is typically administered at a therapeutically or pharmaceutically effective dosage, e.g., a dosage sufficient to provide treatment for non-alcoholic fatty liver disease, reducing and eliminating hepatic fat accumulation. By non-limiting example, the preferred method of administration includes Intraperitoneal (IP) injection. A parenteral administration, generally is characterized by injection, either subcutaneously, intramuscularly or intravenously. Injectables can be prepared in conventional forms, either as liquid solutions or suspensions, solid forms suitable for solution or suspension in liquid prior to injection, or as emulsions. Suitable excipients are, for example, water, saline, dextrose, glycerol, ethanol or the like. In addition, if desired, the pharmaceutical compositions to be administered may also contain minor amounts of non-toxic auxiliary substances such as wetting or emulsifying agents, pH buffering agents, solubility enhancers, and the like, such as for example, sodium acetate, sorbitan monolaurate, triethanolamine oleate, cyclodextrins, etc.

Another approach for parenteral administration employs the implantation of a slow-release or sustained-release system, such that a constant level of dosage is maintained. The percentage of active compound contained in such parenteral compositions is highly dependent on the specific nature thereof, as well as the activity of the compound and the needs of the subject. However, percentages of active ingredient of 0.01% to 10% in solution are employable and will be higher if the composition is a solid which will be subsequently diluted to the above percentages. The composition may comprise 0.2% to 2% of the active agent in solution.

While human dosage levels have yet to be optimized for the present compound, generally, a daily dose is from about 0.01 to 10.0 mg/kg of body weight, for example about 0.1 to 5.0 mg/kg of body weight. The precise effective amount will vary from subject to subject and will depend upon the species, age, the subject's size and health, the nature and extent of the condition being treated, recommendations of the treating physician, and the therapeutics or combination of therapeutics selected for administration. The subject may be administered as many doses as is required to reduce and/or alleviate the signs, symptoms, or causes of the disease or disorder in question, or bring about any other desired alteration of a biological system.

Generally, depending on the intended mode of administration, the pharmaceutically acceptable composition will contain about 0.1% to 90%, for example about 0.5% to 50%, by weight of the present compound, the remainder being suitable pharmaceutical excipients, carriers, etc.

Other useful formulations include those set forth in U.S. Pat. Nos. Re. 28,819 and 4,358,603, the contents of each of which are hereby incorporated by reference.

The following examples relate to various methods of manufacturing the specific compounds and application of the same, as described herein. All compound numbers expressed herein are with reference to the synthetic pathway figures shown above.

EXAMPLES

In-vivo, activation of TLR2/TLR1 suppressed the CD36/PPAR-γ expression in the liver and subsequently prevented fat accumulation in hepatocytes. It was confirmed these results in vitro using human and mouse cell lines (HepG2 and Hepa 1-6 cells).

Example 1

Injections of Pam3CSK4 to Eliminate Fat from the Liver

Figure 2:
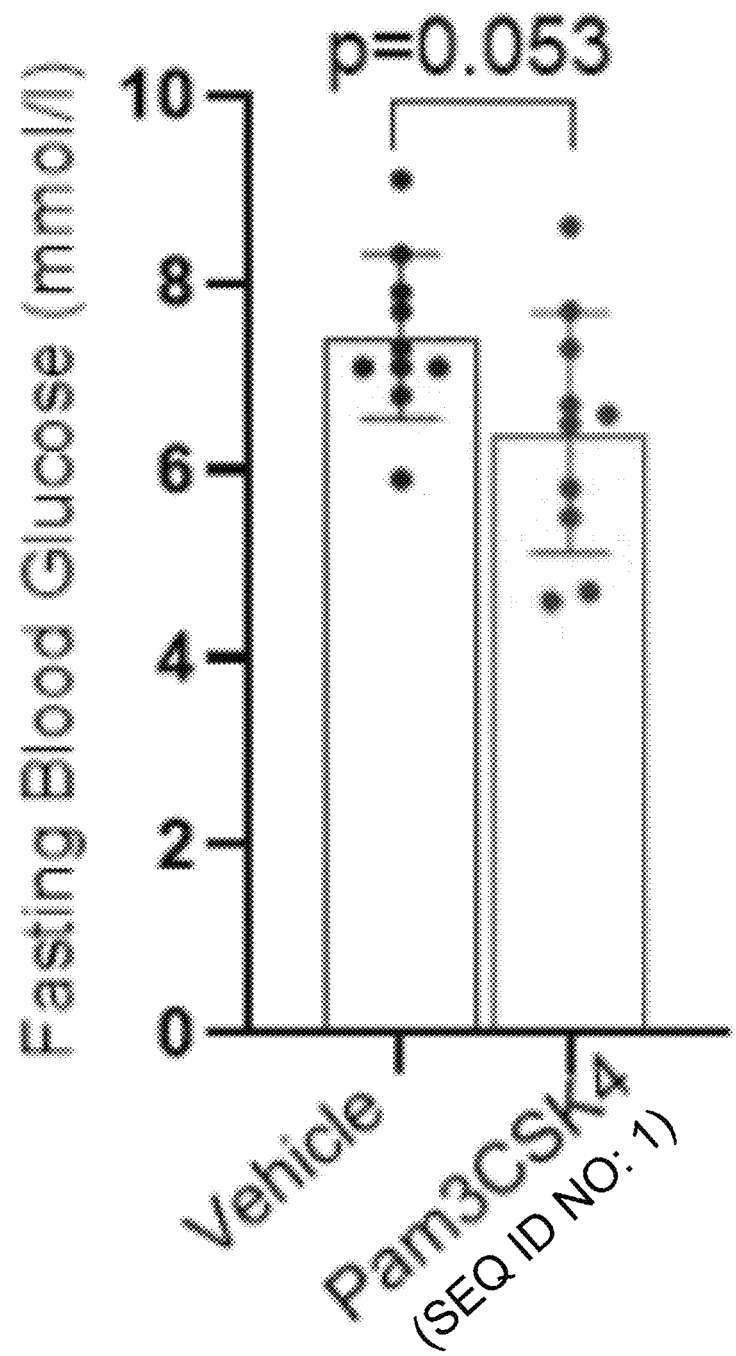
FIG. 2 is a graph showing fasting blood glucose (FBG) in control mice and mice treated with PAM3CSK4 (SEQ ID NO: 1).
Figure 3A:
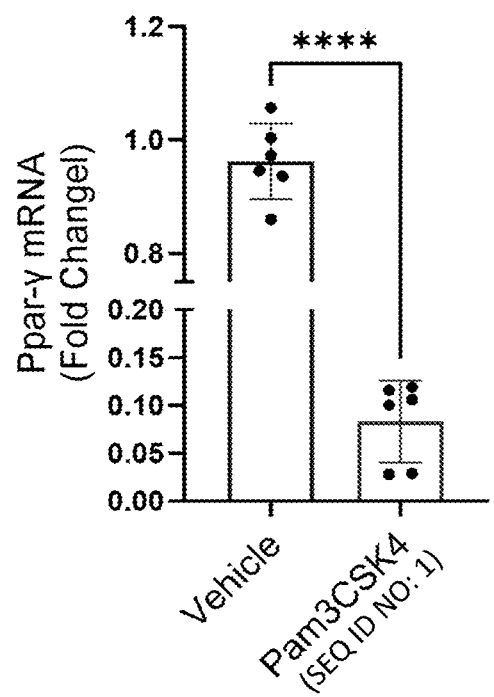
FIGS. 3A-3B are graphs showing Pam3CSK4 (SEQ ID NO: 1) injections suppressed PPAR-γ expression (FIG. 3A) and CD36 expression (FIG. 3B) in the liver and subsequently prevented fat accumulation in the liver.
Figure 3B:
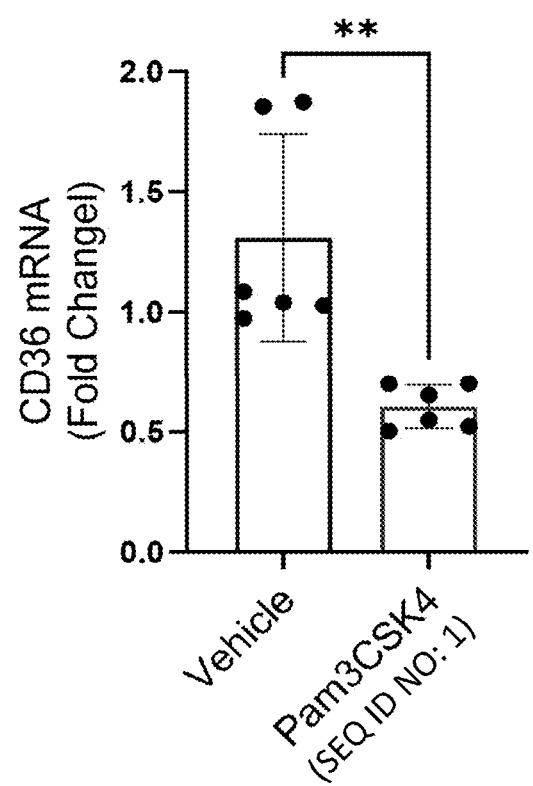

As illustrated in FIG. 1, Pam3CSK4 (SEQ ID NO: 1) was injected into mice to eliminate fat from the liver. In the experiment, 8-10 weeks-old male mice (n–20) were fed a high-fat diet (60% fat). After 16 weeks on a high-fat diet (HFD), C57BL/6 mice revealed a phenotype of liver steatosis and impaired glucose homeostasis. These mice were randomly divided into 2 groups. Mice in Group 1(n–10) received injections of 0.9% normal saline (vehicle) every other day for a duration of two weeks. Mice in Group 2 (n–10) received injections of Pam3CSK4 (SEQ ID NO: 1) (drug:10 µg/kg; IP) every other day for a duration of two weeks. Throughout the treatment period, mice were kept on a high-fat diet. A) Liver sections of the mice were stained with H&E. Referring to FIG. 2, fasting blood glucose was reduced in the mice treated with Pam3CSK4 (SEQ ID NO: 1) compared to mice treated with a vehicle. As described herein, a vehicle is an injection that does not include the active ingredients being tested. By non-limiting example, a vehicle may be saline, a sugar water solution, or other similar substances that may be injected without affecting the subject directly. Data is presented as mean±SD.

Example 2

Pam3CSK4 Injections Reduces the Expression of PPAR-γ

Referring to FIGS. 3A-3B, 8-10 weeks-old male mice (n–20) were fed a high-fat diet (60% fat). After 16 weeks on a high-fat diet (HFD), C57BL/6 mice revealed a phenotype of liver steatosis and impaired glucose homeostasis. These mice were randomly divided into 2 groups. Mice in Group 1 (n=10) received injections of 0.9% normal saline (vehicle) every other day for a duration of two weeks. Mice in Group 2 (n=10) received injections of Pam3CSK4 (SEQ ID NO: 1) (drug:10 µg/kg; IP) every other day for a duration of two weeks. Throughout the treatment period, mice were kept on a high-fat diet. Total RNA was extracted from livers and expression of PPAR-γ (FIG. 3A) and CD36 (FIG. 3B) was determined by qRT-PCR. Data presents as mean±SD.

It is to be understood that the PAM3CSK4 (SEQ ID NO: 1) injection for the prevention and management of MASLD is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

SEQUENCE LISTING

```
Sequence total quantity: 1
SEQ ID NO: 1              moltype = AA  length = 6
FEATURE                   Location/Qualifiers
source                    1..6
                          mol_type = protein
                          organism = synthetic construct
LIPID                     1
                          note = N-Palmitoyl-S-[2,3-bis(palmitoyloxy)-(2RS)-propyl]-
SEQUENCE: 1
CSKKKK                                                                              6
```

We claim:

1. A method of treating metabolic dysfunction-associated steatotic liver disease (MASLD) in a patient comprising administering a therapeutically effective amount of Pam3CysSerLys4 (SEQ ID NO: 1) to the patient in need thereof.

2. The method of claim 1, wherein the therapeutically effective amount of Pam3CysSerLys4 (SEQ ID NO: 1) is administered via an Intraperitoneal (IP) injection.

3. The method of claim 1, wherein the method further reduces hepatic fat accumulation from a baseline.

4. The method of claim 1, wherein the method prevents increasing fat accumulation from a baseline.

5. The method of claim 1, wherein a dosage of the Pam3CysSerLys4 (SEQ ID NO: 1) comprises 10 µg/kg every other day for two weeks.

6. The method of claim 1, wherein the method lowers fasting glucose from a baseline.

7. A method of reducing hepatic fat accumulation in a patient comprising administering a therapeutically effective amount of Pam3CysSerLys4 (SEQ ID NO: 1) to the patient in need thereof.

8. The method of claim 7, wherein the therapeutically effective amount of Pam3CysSerLys4 (SEQ ID NO: 1) is administered via an Intraperitoneal (IP) injection.

9. The method of claim 7, wherein the method prevents more fat accumulation from a baseline.

10. The method of claim 7, wherein a dosage of the Pam3CysSerLys4 (SEQ ID NO: 1) comprises 10 µg/kg every other day for two weeks.

11. The method of claim 7, wherein the method lowers fasting glucose from a baseline.

12. A method of eliminating hepatic fat in a patient comprising administering a therapeutically effective amount of Pam3CysSerLys4 (SEQ ID NO: 1) to the patient in need thereof.

13. The method of claim 12, wherein the therapeutically effective amount of Pam3CysSerLys4 (SEQ ID NO: 1) is administered via an Intraperitoneal (IP) injection.

14. The method of claim 12, wherein the method prevents increasing fat accumulation from a baseline.

15. The method of claim 12, wherein a dosage of the Pam3CysSerLys4 (SEQ ID NO: 1) comprises 10 µg/kg every other day for two weeks.

16. The method of claim 12, wherein the method lowers fasting glucose from a baseline.

* * * * *